US009996866B2

(12) United States Patent
Nichols et al.

(10) Patent No.: US 9,996,866 B2
(45) Date of Patent: Jun. 12, 2018

(54) ITEM LOCATION ASSISTANT WITH CUSTOM PRICE DISPLAY

(71) Applicant: PayPal, Inc., San Jose, CA (US)

(72) Inventors: Timothy Conrad Nichols, Los Altos, CA (US); Geoffrey W. Chatterton, Santa Clara, CA (US); Michael Charles Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 0 days. days.

(21) Appl. No.: 14/469,489

(22) Filed: Aug. 26, 2014

(65) Prior Publication Data

US 2015/0278897 A1 Oct. 1, 2015

Related U.S. Application Data

(63) Continuation-in-part of application No. 14/229,730, filed on Mar. 28, 2014.

(51) Int. Cl.
G06Q 30/06 (2012.01)

(52) U.S. Cl.
CPC ..... G06Q 30/0613 (2013.01); G06Q 30/0639 (2013.01)

(58) Field of Classification Search
CPC .. G06Q 10/087; G06Q 30/06; G06Q 30/0641; G06Q 30/0639; H04W 4/02
See application file for complete search history.

(56) References Cited

U.S. PATENT DOCUMENTS

| 5,880,449 | A | * | 3/1999 | Teicher et al. ................ 235/383 |
| 6,796,507 | B2 | | 9/2004 | Bean et al. |
| 6,798,389 | B1 | * | 9/2004 | Eberhardt, Jr. ................ 345/3.1 |
| 7,184,848 | B2 | * | 2/2007 | Krzyzanowski et al. ...... 700/90 |
| 7,890,434 | B2 | | 2/2011 | Narayanaswami et al. |
| 8,396,485 | B2 | | 3/2013 | Grainger et al. |
| 2002/0178013 | A1 | * | 11/2002 | Hoffman et al. ................ 705/1 |
| 2003/0053014 | A1 | * | 3/2003 | Niiyama ............ G02F 1/13473 349/106 |
| 2005/0256782 | A1 | | 11/2005 | Sands et al. |
| 2010/0013603 | A1 | * | 1/2010 | Chatani et al. ............. 340/10.6 |
| 2010/0114654 | A1 | | 5/2010 | Lukose et al. |
| 2012/0095805 | A1 | * | 4/2012 | Ghosh ............... G06Q 30/0205 705/7.34 |
| 2012/0228240 | A1 | | 9/2012 | Gentile et al. |
| 2013/0030915 | A1 | * | 1/2013 | Statler ................... G06Q 30/06 705/14.54 |

(Continued)

OTHER PUBLICATIONS

International Search Report and Written Opinion, dated Jul. 8, 2015, 9 pages, PCT Patent Application No. PCT/US15/23172.

Primary Examiner — Christopher Stanford
(74) Attorney, Agent, or Firm — Haynes & Boones, LLP

(57) ABSTRACT

Methods and systems for improving a shopping experience are described. When a shopper walks into a store, the shopper's mobile device transmits a signal with the shopper's shopping preferences and shopper profile. Any items that are within a certain distance of the mobile device and satisfy at least one of the shopper's preferences may light up to indicate that the item matches something the shopper is looking for. In addition, the price of the item based on the shopper profile for that shopper is displayed.

20 Claims, 3 Drawing Sheets

(56) References Cited

U.S. PATENT DOCUMENTS

2013/0290106 A1* 10/2013 Bradley ................ G06Q 90/20
    705/14.64
2014/0095285 A1* 4/2014 Wadell .................. G06Q 30/00
    705/14.25
2014/0258028 A1* 9/2014 Bynum et al. ............... 705/26.8

* cited by examiner

ITEM LOCATION ASSISTANT WITH CUSTOM PRICE DISPLAY

CROSS-REFERENCE TO RELATED APPLICATION

Pursuant to 35 U.S.C. § 120, this application claims priority to and is a continuation-in-part of U.S. application Ser. No. 14/229,730, which was filed on Mar. 28, 2014, the entire disclosure of which is incorporated herein by reference.

BACKGROUND

Field of the Invention

The present invention generally relates to assisting a user in a retail store with his or her shopping needs.

Related Art

It is tedious to sort through and find items in a store. Often, the store is crowded, items are placed too close together, and items are not in the correct place. A consumer typically must sift through racks and racks of clothing, or travel up and down different aisles before he or she can find what he or she is looking for. By the time the consumer finds what he or she wants, the consumer is tired and in a bad mood because of all the time wasted searching for an item.

In addition, there are several different classes of consumers. For example, one consumer may have a merchant loyalty card, another consumer may have merchant coupons or gift cards, and yet another consumer may have merchant reward points. Prices of items for these classes of consumers may be different for different items. Typically, only a single price is displayed the consumer, and a consumer is not informed about special discounts or prices until checkout. In several situations, the consumer is not informed at all about special discounts or prices. Thus, a need exists for systems and methods that improve the shopping experience of users.

Figure 1:
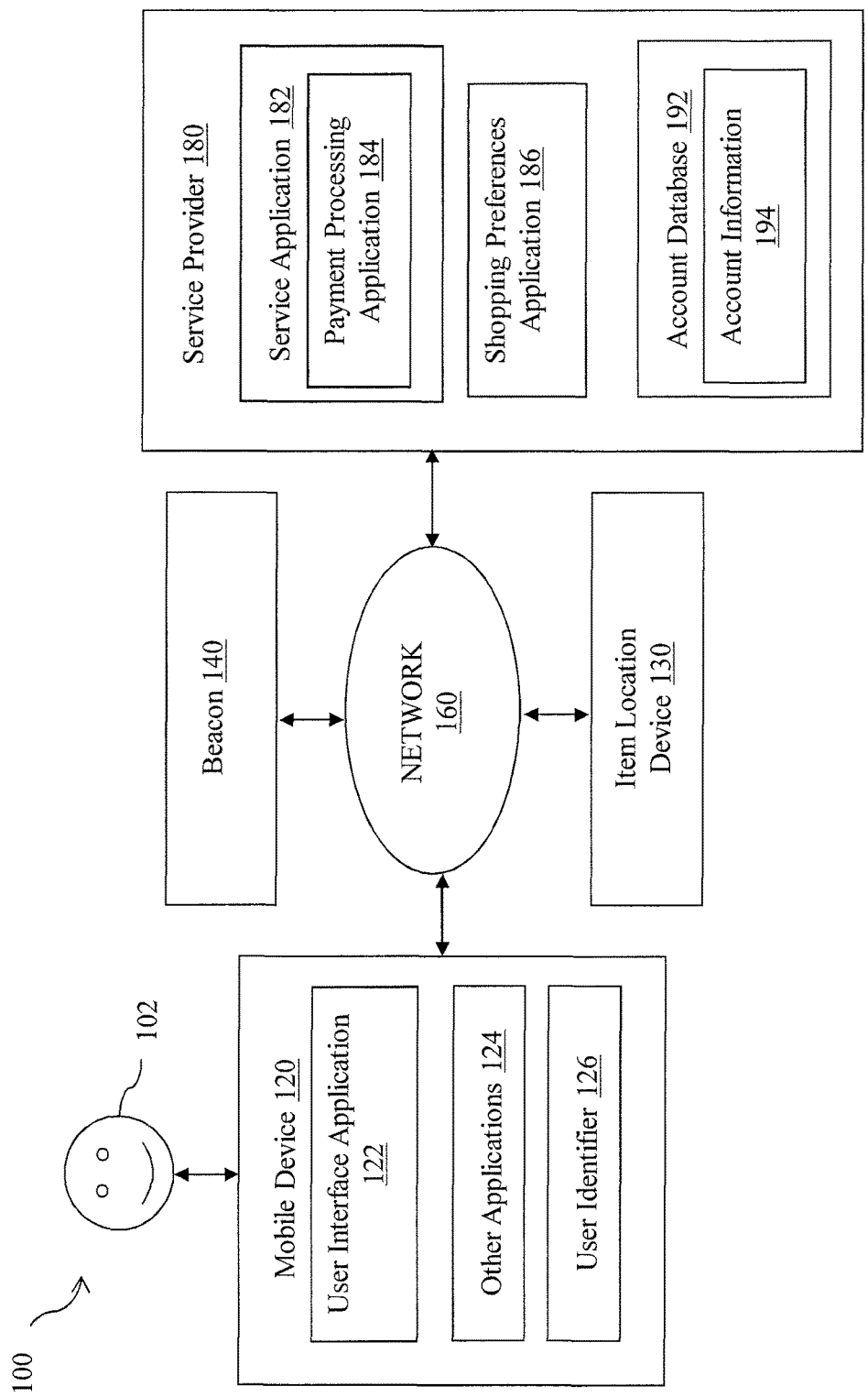
FIG. 1 is a block diagram illustrating a system for improving a shopping experience according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that assist a shopper with finding items at a store. When the shopper is sensed in a location where an item of interest is stocked, the shopper's attention is drawn to the item location by, for example, illumination on or near the item. The illumination can be from a light device (e.g., a light emitting diode (LED)).

In various embodiments, a service provider examines the shopping history of a shopper and predicts the shopping preferences of the shopper. Shopping preferences include styles, sizes, brands, colors, prices, categories, merchants, etc. When a shopper walks into a store, the shopper's mobile device transmits a signal with the shopper's predicted shopping preferences. Any items that are within a certain distance of the mobile device and satisfy at least one of the shopper's preferences may light up to indicate that the item matches something the shopper is likely to be interested in.

In certain embodiments, the mobile device transmits the shopper's profile, and based on the shopper's profile, the price of the item of interest is displayed to the shopper. The shopper's profile describes the type of customer the shopper is and/or what customer group the shopper belongs in. Accordingly, the shopper's profile includes information such as if they are a holder of a loyalty card or are frequent shoppers, have coupons or reward points, what age group the shopper is in (e.g., student, adult, senior citizen, etc.), the occupation of the shopper (e.g., military, police, fire department, etc.), and spending habits of the shopper (e.g., what the shopper has bought in the past and how much the shopper has paid for various items). A shopper with a certain profile will be shown a certain price, i.e., the price that will be charged at checkout. Advantageously, the shopper does not need to calculate the price on his or her own by checking coupons or rewards, balances, points, etc.

In an exemplary embodiment, a shopper walks into a clothing store. In the store, hangers on the clothes rack are equipped with small LED lights located on the upper portion of the hanger where it is not blocked by the garment. The shopper's mobile device transmits the shopper's preferences (e.g., size) and the shopper's occupation (e.g., military) to the clothes rack. The LEDs attached to hangers that match that size light up with a blinking or colored light. Only the hangers displaying that size clothing light up. The LEDs also form part of a price tag or screen that displays a custom price for the shopper. In this embodiment, because the shopper is employed by the military, he or she receives a discounted price. In an alternative embodiment, the LEDs could be attached to the clothing items or a tag hanging from the clothing items. The shopper may be notified, additionally or alternatively, by sound or other user perceptible means, such as if the user is hearing or vision impaired, the store is loud or bright, or other factors that may make the notification more effective or apparent to the shopper.

FIG. 1 shows one embodiment of a block diagram of a network-based system 100 adapted to facilitate item location and display of custom pricing using a mobile device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a mobile device 120 (e.g., a smartphone), one or more item location devices 130 (e.g., RFID tag), a beacon 140 (e.g., a BLE beacon) and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The mobile device 120, in one embodiment, may be utilized by the user 102 to interact with the beacon 140 and/or the service provider server 180 over the network 160. For example, the user 102 may conduct financial transactions (e.g., account transfers) with the service provider server 180 via the mobile device 120. The mobile device 120, in various embodiments, may be implemented using any appropriate combination of hardware and/or software configured for wired and/or wireless communication over the network 160. In various implementations, the mobile device 120 may include at least one of a wireless cellular phone, wearable computing device, etc.

The mobile device 120, in one embodiment, includes a user interface application 122, which may be utilized by the user 102 to conduct transactions (e.g., shopping, purchasing, bidding, etc.) with the service provider server 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

The mobile device 120, in various embodiments, may include other applications 124 as may be desired in one or more embodiments of the present disclosure to provide additional features available to user 102. In one example, such other applications 124 may include security applications for implementing client-side security features, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

In various implementations, a user profile may be created using data and information obtained from cell phone activity over the network 160. Cell phone activity transactions may be used by the service provider server 180 to create at least one user profile for the user 102 based on activity from the mobile device 120 (e.g., cell phone). The user profile may be updated with each financial and/or information transaction (e.g., payment transaction, purchase transaction, etc.) achieved through use of the mobile device 120. In various aspects, this may include the type of transaction and/or the location information from the mobile device 120. As such, the profile may be used for recognizing patterns of potential fraud, setting transaction limits on the user, etc.

The mobile device 120, in one embodiment, may include at least one user identifier 126, which may be implemented, for example, as operating system registry entries, cookies associated with the user interface application 122, identifiers associated with hardware of the mobile device 120, or various other appropriate identifiers. The user identifier 126 may include one or more attributes related to the user 102, such as personal information related to the user 102 (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the user 102 with a particular user account maintained by the service provider server 180.

In various implementations, the user 102 is able to input data and information into an input component (e.g., a keyboard) of the mobile device 120 to provide user information with a transaction request, such as a fund transfer request. The user information may include user identification information.

In one embodiment, the mobile device 120 is configured to transmit the user 102's shopping preferences and shopper profile (e.g., occupation, spending habits, age group, purchase history, etc.) by use of a short-range transmitter so that when the user 102 approaches items at a store, items that meet the shopping preferences light up, responsive to receiving the transmission that includes the preferences, and the price associated with the shopper profile is displayed to the user 102. The short range transmissions can be accomplished by transmission of a periodic low power radio (or other medium) signal that includes the shopping preferences and the shopper profile. In an embodiment, once a store wireless terminal receives the signals, it identifies the matching items, causes a location indicator such as a light to alert the user 102 of the item's location, and causes a custom price to be displayed to the user 102.

The one or more item location devices 130, in various embodiments, may be maintained by one or more business entities (or in some cases, by a partner of a business entity that processes transactions on behalf of business entities). Examples of businesses entities include merchants that offer various items for purchase and payment. In some embodiments, business entities may need registration of the user identity information as part of offering items to the user 102 over the network 160.

In a store that includes multiple items, the item location device 130 is placed proximate to one or more items for sale. For example, the item location device 130 may be affixed to a display apparatus, such as a shelf, or directly to an item. In an exemplary embodiment, the item location device 130 includes a hanger, tag, or label.

In another example, the item location device 130 may be incorporated into a price display system proximate to an item, such as an LED price tag. The price display system can be any display monitor, screen, touch screen, interface or other device capable of displaying information, including a digital liquid crystal display (LCD) or LED screen. In an exemplary embodiment, the price display system includes a backlight that lights up to alert the user 102 about an item of interest and a display component to present the custom price to the user 102. In some embodiments, the color of the displayed price or the backlight identifies a specific user, e.g., a user may be associated with a specific color. For instance, the color blue may be associated with a first user, and the color red may be associated with a second, different user so that each user can identify their own specific items of interest and/or specific custom price.

The custom price is determined, in various embodiments, by the user's shopper profile. For example, a user who is a frequent shopper or has a loyalty card may be shown a price that is lower than a user who is not a frequent shopper. The price displayed to a user who has coupons or rewards stored in a digital wallet may be less than the price displayed to a user without coupons because the coupons and rewards can be applied to the price.

The shopper profile may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items.

The item location device 130 includes a wireless communication device implemented by any type of wireless communication method including, but not limited to radio frequency (RF), infrared red (IR), Bluetooth low energy (BLE), Wi-Fi, inductive coupling, and ultrasound. In one embodiment, the item location device 130 includes a radio frequency identification (RFID) tag or label.

In various embodiments, the item location device 130 includes an LED light or other light source that is powered on when an item associated with the item location device 130 matches one or more of the user 102's shopping preferences. The item location device 130 may include an LED light of one color (e.g., red), or may include LED lights of different colors (e.g., red, yellow, green, blue, orange, purple, etc.) where the color of the LED light indicates what shopping preference is met (e.g., red indicates that the item matches a color preference and green indicates that the item matches a price preference). In one embodiment, the color of the LED light indicates how many shopping preferences are met (e.g., green indicates that an item satisfies size, color, and style while orange indicates that an item only satisfies size).

In another example, the color of the LED light indicates which items are more highly recommended versus those items that are less recommended. The LED lights are used to indicate the relative popularity of an item. For instance, more popular items light up with a red color, and the least popular items can light up with a blue color. In some embodiments, only items with a buyer's rating over a certain threshold are lit. For example, only highly rated toys for a 10-year old boy that are under $20 may power on.

The item location device 130 can include multiple sets of LED lights that can light up for multiple users at the same time. The color of the LED light can indicate whose shopping preferences the item meets. For instance, when multiple users are in the area of the item location device 130, a red LED light that powers on may indicate an item that a first user is interested in, while a green LED light may indicate an item that a second, different user is interested in.

In some embodiments, the multiple sets of LED lights display custom prices for multiple users at the same time. The color of the displayed price can indicate who the price is for. For example, a yellow colored price may indicate the price for a frequent shopper, while a purple colored price may indicate the price for shopper in the military.

In some aspects, the LED lights on the item location device 130 can be triggered by the prices of items (e.g., custom prices). For example, all items priced less than $20 may light up when user 102 approaches the item location device 130. In another example, items priced between $50 and $100 may light up when the user 102 is within the vicinity of the item location device 130. The distance of the user from an item to trigger the visual indication may vary depending on various factors, such as density of items on the floor, type of item, etc., such as by turning the power of a BLE beacon higher or lower.

In one implementation, the LED lights are powered on for suggested items that are frequently purchased along with an item that the user 102 has previously purchased (e.g., users who bought this item also bought this) or an item that matches the user 102's shopping preference. These suggested items may be items best matching or complementary to the other item in terms of functionality, style, design, and/or graphics. For example, if the user 102 previously bought a pair of suit pants, a suggested item may be the matching suit jacket, a pair of pumps, or a statement necklace. In various aspects, related items can be marked with a special color.

Beacon 140 may be set up by merchants or individuals offering various items, such as products and/or services for sale. As defined herein, a "beacon" is a short range communication device having a known or fixed location that provides a signal that can be detected by mobile devices within a certain proximity of the beacon. An example of a beacon is a RF beacon (e.g., BLE beacon), infrared beacon or a RFID tag. For example, a BLE beacon can broadcast an RF signal that includes its position coordinates (e.g., latitude, longitude), which can be detected by a mobile device. In some implementations, the beacon can also advertise location based services provided by a beacon network. A beacon network encompasses a plurality of beacons in a geographic region.

Beacon 140 is typically maintained by one or more service providers. When the user 102 comes in range of beacon 140, a mobile application on the mobile device 120 run by a service provider can wake up and connect to the beacon 140. Mobile device 120 can then receive messages from beacon 140. In some implementations, beacon 140 is a BLE beacon.

Beacon 140 can output a wireless signal that can be detected by mobile device 120 when mobile device 120 is within a certain proximity of the beacon 140. Beacon 140 may be a device that periodically or continuously transmits a signal, such as a short-distance wireless (e.g., BLE), medium distance wireless (e.g., Wi-Fi), and/or other electro, magnetic, and/or electro-magnetic transmissions. Power on beacon 140 can be adjusted to communicate only within a desired range, which may depend on intended message ranges. Mobile device 120 is configured to detect the transmitted signals from beacon 140, such that when mobile device 120 is located within the transmission range of beacon 140, the signal may be detected.

The service provider server 180, in one embodiment, may be maintained by a transaction processing entity or an online service provider, which may provide processing for financial transactions and/or information transactions between the user 102 and one or more merchants As such, the service provider server 180 includes a service application 182, which may be adapted to interact with the mobile device 120 over the network 160 to facilitate the searching, selection, purchase, and/or payment of items by the user 102 from one or more merchants. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service application 182, in one embodiment, utilizes a payment processing application 184 to process purchases and/or payments for financial transactions between the user 102 and a merchant. In one implementation, the payment processing application 184 assists with resolving financial transactions through validation, delivery, and settlement. As such, the service application 182 in conjunction with the payment processing module 184 settles indebtedness between the user 102 and a merchant, wherein accounts may be directly and/or automatically debited and/or credited of monetary funds in a manner as accepted by the banking industry.

The service provider server 180, in one embodiment, may be configured to maintain one or more user accounts and merchant accounts in an account database 192, each of which may include account information 194 associated with one or more individual users (e.g., user 102) and merchants. For example, account information 194 may include private financial information of user 102 and merchants, such as one or more account numbers, passwords, credit card information, banking information, or other types of financial information, which may be used to facilitate financial transactions between user 102, and one or more merchants. Account information 194 may also include information regarding user purchases, such as amounts spent, merchants frequented, products/services bought, and/or categories of products/services bought. In certain embodiments, account information 194 also includes shopper profile information such as rewards, points, and/or coupons accumulated by the user 102 for specific merchants, loyalty card programs participated in by the user 102, and demographic information for user 102 (e.g., age, address, income, occupation, education, etc.). In various aspects, the methods and systems described herein may be modified to accommodate users and/or merchants that may or may not be associated with at least one existing user account and/or merchant account, respectively.

In one implementation, the user 102 may have identity attributes stored with the service provider server 180, and user 102 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

In various embodiments, the service provider server 180 includes a shopping preference application 186. The shopping preference application 186 analyzes the user 102's purchases (both online and offline), learns what the user 102's shopping preferences are, predicts what items the user 102 is interested in, and suggests items to the user 102. For example, the shopping preference application 186 can use collected purchase information in account database 192 to determine what categories of products or services the user 102 typically buys and the set of merchants frequented. This information can be used to drive recommendations or suggestions related to relevant products, categories, or merchants.

In some embodiments, the shopping preference application 186 determines what contacts in the user 102's social network (e.g., friends, co-workers, family, etc.) have purchased and ensures that the user 102 does not purchase an identical or similar item. For example, user 102 is planning to go to a work function and needs to buy a dress for the occasion. The application 186 determines what user 102's co-workers and others attending the work function have bought, based on purchase history available in account database 192. Once the application 186 knows what clothing they have purchased, the application 186 makes sure that identical clothing is not recommended or suggested to the user 102. In another example, the user 102 may be attending a bridal or baby shower and purchasing a gift. The application 186 can help ensure that user 102 does not bring an identical gift to the shower. Thus, even if an item would otherwise be shown (or lit) as being a recommended item, the item will not be visually shown as recommended if the item was purchased by a contact of the user 102. In one embodiment, a determination is further made as to whether the user 102 may not want to purchase the item if a contact had also purchased the item. Factors may include how long ago the contact purchased the item, whether the contact and the user 102 will be attending the same event (such as a wedding, birthday party, shower, etc.), the relative distances from the contact to the user 102 (such as at current locations, at the time of an event the user may be buying the item for, etc.), and how close in appearance the recommended item is to the item purchased by the contact (such as if it is the same color, has the same pattern, etc.).

Figure 2:
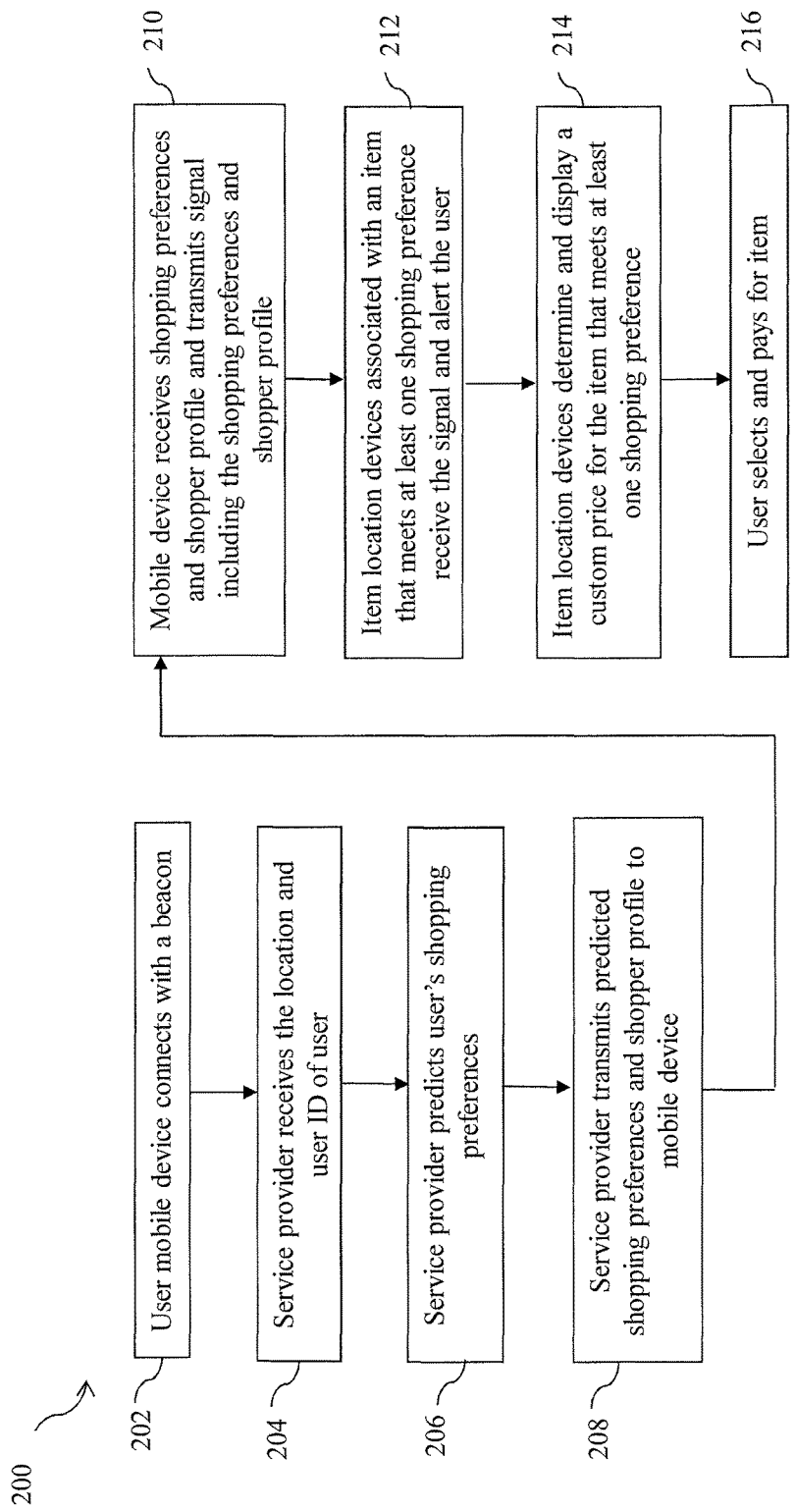
FIG. 2 is a flowchart showing a method for improving a shopping experience according to an embodiment of the present disclosure.

Referring now to FIG. 2, a flowchart 200 of a method for improving a shopping experience is illustrated according to an embodiment of the present disclosure. In various embodiments, the user 102 registers with a service provider, which runs a mobile application. Registration may include signing up for the service and agreeing to any terms required by the service provider, such as through a user device. In one embodiment, the user device is a mobile computing device, such as a smart phone, a PC, or a computing tablet. In other embodiments, registration may be done completely through the user device, partially through the user device, or without using the user device, such as through a phone call or in-person visit to a representative of the payment service provider.

The user may be requested to provider specific information for registration, such as, but not limited to, a name, address, phone number, email address, picture, a user name for the account, and a password or PIN for the account. The type of information may depend on whether the user already has an account with the service provider. Requested information may be entered through the user device or other means, including voice or manual key entry. Once all the requested information is received and confirmed, the service provider may create an account for the user.

At step 202, the user 102 enters a retail store with multiple items for sale and mobile device 120 makes a connection with beacon 140. Beacon 140 passes mobile device details (e.g., user identifier 126) to service provider server 180. The location information of beacon 140 is also sent to the service provider server 180. The beacon 140 at the store location senses user 102's presence by way of electronic communication with mobile device 120. As such, user 102's specific location inside the store can be determined using the beacon 140.

At step 204, the service provider server 180 receives the location and user ID of the user 102, and at step 206, uses this information to predict the user 102's shopping preferences (e.g., what items in the location would be of interest to the user 102). For example, if the user 102 is located in the home goods section of a department store, the server 180 determines if the user 102 is interested in comforters, pillows, sheets, lamps, mattresses, etc., and if so, determines what type of item the user 102 is interested in. In various embodiments, the server 180 analyzes the past shopping history of the user 102, including product categories, brand names, specific product identifiers, styles, sizes, colors, prices, etc. If the user 102 previously bought an item in a product category with a specific brand name, the server 180 may determine that the user 102 has a brand preference. The user 102's shopping history can be extended to predict several shopping preferences of the user 102: what kinds of products the user 102 typically purchases (e.g., clothes or electronics), brand loyalty, merchant loyalty, and frugality (e.g., the user 102 usually purchases the lowest cost option or items on sale).

Instead of the user 102 taking the time to manually input specific shopping preferences, the server 180 studies what the user 102 has bought in the past and learns what the user 102 is likely to want. In some embodiments, the server 180 searches through data of the user 102's purchases to look for patterns. For example, if the user 102 frequently purchases high heels, the server 180 can deduce that the user 102 has a preference for high heeled shoes.

With a large amount of shopping data, the server 180 can piece or combine attributes or characteristics of items together to make recommendations or suggestions to the user 102. For example, the server 180 may determine that the user 102 likes the color red because the user 102 frequently buys red lipstick, red shoes, and red stationery. The server 180 also determines that the user 102 enjoys baking because the user 102 has purchased baking pans, cupcake pans, oven mitts, cupcake holders, and cookie cutters. When the user 102 enters a Target® store, the server 180 can recommend a red KitchenAid® mixer to the user 102, even though the user 102 has never purchased a KitchenAid® mixer.

In another embodiment, the service provider server 180 examines what the user 102 has bought in the past and analyzes what other shoppers who bought similar items viewed or purchased. For example, assume the user 102 bought a collared crewneck sweater. The server 180 determines that other shoppers who bought that same collared crewneck sweater or a collared crewneck sweater in the same style also bought a pencil skirt together with the crewneck sweater. The server 180 can predict that the user 102 is likely to have a shopping preference for a pencil skirt and alert the user 102 when a pencil skirt is nearby.

In one aspect, the server 180 may also determine a preference by accessing a wish list or shopping list of user 102. In this way, user 102 may only see specific items (such as desired size and price) that are of immediate interest lit up, resulting in a more efficient shopping experience. Items of possible interest to the user 102, as predicted by the server 180, would not be lit up, thereby only showing items the user 102 has indicated a specific interest in.

In one embodiment, the server 180 analyzes what shoppers in the user 102's social network have bought and protects the user 102 from purchasing an identical item. As such, even though an item may otherwise be recommended (on a wish list, correct size, desired color, etc.), the item would not be recommended if the server 180 determines that the user 102 may not want to purchase the item because a friend or contact of the user 102 purchased the same or similar item. The server 180 can recommend or suggest items that are similar in style, color, or design to the item.

At step 208, the server 180 transmits the predicted shopping preferences of the user 102 and the shopper profile of the user 102 to the mobile device 120. The shopper profile includes information such as age group, spending habits, accumulated rewards and coupons, loyalty card program participation, and occupation. At step 210, the mobile device 120 receives the shopping preferences and shopper profile and transmits short-range signals (e.g., RF signals) that include the shopping preferences and shopper profile. The signal is typically a short-range signal so that the transmission strength of the signal is strong enough to be received by item location devices 130 only when the user 102 is close enough to see the item location devices 130.

The range of distance between the mobile device 120 and the item location device 130 is usually predetermined by the retail store. In most embodiments, the distance is based on the type and size of the store. For example, in a large supermarket where a shopper can easily see most items along an entire aisle, the range can be set to encompass the length of the aisle. In a small, crowded boutique where the shopper has a limited range of vision, the range can be set to be a circle with a small diameter. When the shopper is within range, the item location device 130 lights up, and when the shopper moves out of the range, the item location device 130 turns off.

At step 212, item location devices 130 that are associated with an item that meets at least one of the user 102's shopping preferences receive the signal from mobile device 120 and alert the user 102. In one embodiment, the item location device 130 includes an LED light that powers on upon receiving the signal.

Items may include clothing, hardware, supplies, food, etc. For example, if the predicted shopping preference is a pink t-shirt in a size 8, an LED attached to an item location device 130 (e.g., hanger) associated with such a t-shirt lights up with the blinking light. Only those item location devices 130 displaying a pink t-shirt in a size 8 would light up so that the user 102 would know at a glance what clothing items to inspect. The user 102 does not have to pick up each t-shirt and search for a size tag. In a hardware store, different types of nails made from different types of materials (asphalt, copper, or steel) and having different types of heads (broadhead, flathead, or no head) may be displayed. Only tags close to those nails that satisfy the predicted shopping preferences of the user 102 (e.g., asphalt with a broadhead) would light up. In an office supply store, different types of pens (ballpoint, rollerball, fountain) in different colors (black, red, blue) having different line widths (fine, medium, wide) may be for sale. Only those pens that match what the user 102 is looking for (e.g., blue ballpoint pen having a fine line width) would be brought to the attention of the user 102. When in an aisle of a grocery store, tags light up near the food items that the user 102 is likely to purchase or that are recommended for purchase.

In exemplary embodiments, the item location devices 130 are incorporated in a price display system. When the item location devices 130 receive the user's shopper profile from the mobile device 120, at step 214, the item location devices 130 can determine and display a custom price for an item that matches at least one of the user 102's shopping preferences. For example, the user 102 may be a frequent shopper at the merchant where the item location devices 130 are located, and a discount may be applied to the "regular price" so that a discounted price is displayed to the user 102. In another example, the user 102 may be a senior citizen, and the senior citizen discount price is displayed to the user 102. The user-specific price for the item may also, or alternatively, be displayed to the user 102 on the mobile device 120.

At step 216, the user 102 selects and pays for the item. For example, the user 102 may swipe a card at a merchant payee device. The payee device contacts the service provider server 180 and passes along the payment request. The service provider server 180 receives the payment request and processes the payment request so that the merchant is paid with funds in the user 102's financial account.

In addition to sending a signal to highlight desired items, in an embodiment, mobile device 120 can also download an electronic map of the store and guide the user 102 to the locations in the store that contain items that the user 102 is interested in. For example, the user 102 may be shopping at Nordstrom, and the service provider server 180 determines that Nordstrom includes items that meet the user 102's shopping preferences in the clothing section, shoes section, make-up section, and home section. The mobile device 120 can present a store map that highlights locations in the store where items of interest are—identifying both where the items are, and where the shopper is.

Figure 3:
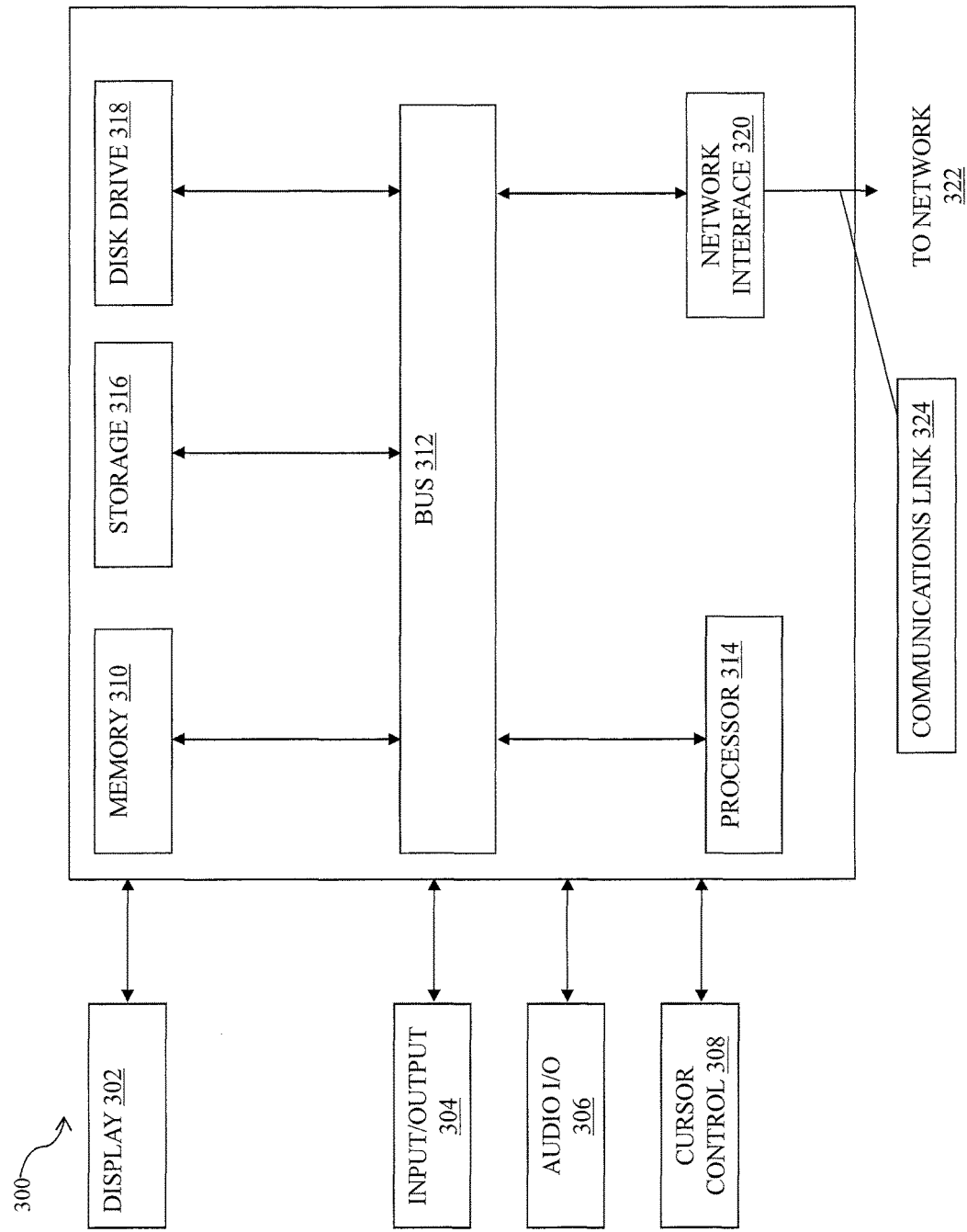
FIG. 3 is a block diagram of a system for implementing a device according to an embodiment of the present disclosure.

FIG. 3 is a block diagram of a computer system 300 suitable for implementing one or more embodiments of the present disclosure, including the mobile device 120, the item location device 130, beacon 140, and the service provider server 180. In various implementations, the mobile device 120, the item location device 130, and beacon 140 may comprise a mobile cellular phone, personal computer (PC), laptop, etc. adapted for wireless communication, and the service provider server 180 may comprise a network computing device, such as a server. Thus, it should be appreciated that the devices 120, 130, 140, and 180 may be implemented as computer system 300 in a manner as follows.

Computer system 300 includes a bus 312 or other communication mechanism for communicating information data, signals, and information between various components of computer system 300. Components include an input/output (I/O) component 304 that processes a user (i.e., sender, recipient, service provider) action, such as selecting keys from a keypad/keyboard, selecting one or more buttons or links, etc., and sends a corresponding signal to bus 312. I/O component 304 may also include an output component, such as a display 302 and a cursor control 308 (such as a keyboard, keypad, mouse, etc.). An optional audio input/output component 306 may also be included to allow a user to use voice for inputting information by converting audio signals. Audio I/O component 306 may allow the user to hear audio. A transceiver or network interface 320 transmits and receives signals between computer system 300 and other devices, such as another user device, a merchant server, or a service provider server via network 322. In one embodiment, the transmission is wireless, although other transmission mediums and methods may also be suitable. A processor 314, which can be a micro-controller, digital signal processor (DSP), or other processing component, processes these various signals, such as for display on computer system 300 or transmission to other devices via a communication link 324. Processor 314 may also control transmission of information, such as cookies or IP addresses, to other devices.

Components of computer system 300 also include a system memory component 310 (e.g., RAM), a static storage component 316 (e.g., ROM), and/or a disk drive 318. Computer system 300 performs specific operations by processor 314 and other components by executing one or more sequences of instructions contained in system memory component 310. For example, processor 314 can receive the location and user ID of a user, analyze a user's shopping history, predict a user's shopping preferences, cause an item location device to alert a user, cause an item location device to display a custom price to a user, receive payment requests, and process payment requests. Logic may be encoded in a computer readable medium, which may refer to any medium that participates in providing instructions to processor 314 for execution. Such a medium may take many forms, including but not limited to, non-volatile media, volatile media, and transmission media. In various implementations, non-volatile media includes optical or magnetic disks, volatile media includes dynamic memory, such as system memory component 310, and transmission media includes coaxial cables, copper wire, and fiber optics, including wires that comprise bus 312. In one embodiment, the logic is encoded in non-transitory computer readable medium. In one example, transitory transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 324 to the network (e.g., such as a LAN, WLAN, PTSN, and/or various other wired or wireless networks, including telecommunications, mobile, and cellular phone networks) may perform instruction sequences to practice the present disclosure in coordination with one another.

In view of the present disclosure, it will be appreciated that various methods and systems have been described according to one or more embodiments for improving a shopping experience.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled to the non-transitory memory and configured to read instructions from the non-transitory memory to cause the system to perform operations comprising:
receiving a location and a user identification associated with a user;
determining, based on the user identification, shopper preferences for the user;
determining, based on the location associated with the user, that the user is within a predetermined distance of an item;
determining, based on a level of correlation between the shopper preferences and the item, a first color from a plurality of colors, wherein each of the plurality of colors indicates a different level of correlation; and
causing an item location device that corresponds to the item to illuminate the first color.

2. The system of claim 1, wherein the operations further comprise:
determining, based on the user identification, shopper profile information for the user; and
causing the item location device to display a price of the item for the user based on the shopper profile information, wherein the shopper profile information comprises at least one of: a merchant loyalty card status, a frequent shopper status, a merchant coupon or a reward, an age group of the user, an occupation of the user, a spending habit of the user, or a past purchase of the user.

3. The system of claim 1, wherein the level of correlation represents a number of the shopper preferences being met by attributes of the item.

4. The system of claim 1, wherein the operations further comprise:
determining a second item that matches or complements the item; and
causing a second item location device that corresponds to the second item to illuminate the first color.

5. The system of claim 1, wherein the operation further comprise:
determining that a second user is located within a predetermined distance from the item;
determining a second color for the second user based on shopper preferences of the second user; and
causing the item location device to illuminate the second color for the second user.

6. The system of claim 1, wherein the operations further comprise retrieving a purchase history of the user based on the user identification, wherein the shopper preferences of the user is determined based on the retrieved purchase history.

7. The system of claim 1, wherein the predetermined distance is determined based on a density of items at the location of the user.

8. A method for improving a shopper experience, comprising:
receiving, by one or more hardware processors of a service provider, a location and a user identification associated with a user from a beacon;
determining, by the one or more hardware processors, based on the user identification, shopper preferences for the user;
determining, based on the location associated with the user, that the user is within a predetermined distance of a first item;
determining, based on a level of correlation between the shopper preferences and the first item, a first color from a plurality of colors, wherein each of the plurality of colors indicates a different level of correlation; and
causing an item location device that corresponds to the first item to illuminate the first color.

9. The method of claim 8, further comprising:
determining, based on the user identification, shopper profile information for the user; and
causing the item location device to display a price of the first item for the user based on the shopper profile information, wherein the shopper profile information comprises at least one of: a merchant loyalty card status, a frequent shopper status, a merchant coupon or a reward, an age group of the user, an occupation of the user, a spending habit of the user, or a past purchase of the user.

10. The method of claim 8, wherein the level of correlation represents a number of the shopper preferences being met by attributes of the first item.

11. The method of claim 8, wherein the determining the first color comprises determining a density of the first color based on a distance of the location of the user from a location of the first item.

12. The method of claim 8, further comprising:
determining, based on a second level of correlation between the shopper preferences and attributes of a second item, a second color from the plurality of colors; and
causing a second item location device that corresponds to the second item to illuminate the second color.

13. The method of claim 8, further comprising:
determining that a second user is located within a predetermined distance from the item;
determining a second color for the second user based on shopper preferences of the second user; and
causing the item location device to illuminate the second color for the second user.

14. The method of claim 8, further comprising transmitting the shopper preferences to a mobile device of the user.

15. A non-transitory machine-readable medium having stored thereon machine-readable instructions executable to cause a machine to perform operations comprising:
receiving a location and a user identification associated with a user;
determining, based on the user identification, shopper preferences for the user;

determining, based on the location associated with the user, that the user is within a predetermined distance of an item;

determining, based on a level of correlation between the shopper preferences and the item, a first color from a plurality of colors, wherein each of the plurality of colors indicates a different level of correlation; and causing an item location device that corresponds to the item to illuminate the first color.

16. The non-transitory machine-readable medium of claim 15, wherein the operations further comprise:

determining, based on the user identification, shopper profile information for the user; and causing the item location device to display a price of the item for the user based on the shopper profile information, wherein the shopper profile information comprises at least one of: a merchant loyalty card status, a frequent shopper status, a merchant coupon or a reward, an age group of the user, an occupation of the user, a spending habit of the user, or a past purchase of the user.

17. The non-transitory machine-readable medium of claim 15, wherein the determining the first color comprises determining a density of the first color based on a distance between the location of the user from a location of the item.

18. The non-transitory machine-readable medium of claim 15, wherein the level of correlation represents a number of the shopper preferences being met by attributes of the item.

19. The non-transitory machine-readable medium of claim 15, wherein the operations further comprise:

determining that a second user is located within a predetermined distance from the item;

determining a second color for the second user based on shopper preferences of the second user; and causing the item location device to illuminate the second color for the second user.

20. The non-transitory machine-readable medium of claim 15, wherein the operations further comprise transmitting the shopper preferences to a mobile device of the user.

* * * * *